United States Patent [19]

Knuuttila et al.

[11] Patent Number: 5,250,276
[45] Date of Patent: Oct. 5, 1993

[54] METHOD FOR PREPARING FERRIC CHLORIDE

[75] Inventors: Pekka Knuuttila, Porvoo; Simo Jokinen, Oulu; Vesa-Pekka Judin; Juhatuomas Vuorisalo, both of Pori; Simo Salanne, Oulu, all of Finland

[73] Assignees: Neste Oy; Kemira Oy, both of Finland

[21] Appl. No.: 811,313

[22] Filed: Dec. 20, 1991

[30] Foreign Application Priority Data

Dec. 21, 1990 [FI] Finland ................... 906351

[51] Int. Cl.$^5$ ............................. C01G 49/10
[52] U.S. Cl. ......................... 423/138; 423/493
[58] Field of Search ............ 423/138, 139, 147, 148, 423/493

[56] References Cited

U.S. PATENT DOCUMENTS 4,874,483 10/1989 Wakabayashi et al. .............. 204/94

FOREIGN PATENT DOCUMENTS 5711833 5/1986 Japan.
1313806 5/1987 U.S.S.R. .

*Primary Examiner*—David Brunsman
*Attorney, Agent, or Firm*—Steinberg & Raskin

[57] ABSTRACT

A method for preparing anhydrous ferric chloride from a hydrous solution containing ferric chloride that contains organic substances and/or ferrous chloride. In the method, water is removed from a ferric-chloride water solution or a solution, in which at least a portion of the ferrous chloride has been converted by oxidation into ferric chloride, by drying in an atmosphere containing hydrochloric acid. The anhydrous ferric chloride is refined by sublimating it into gas phase in a chlorine-containing atmosphere and by subliming it into a pure crystalline ferric chloride.

7 Claims, 1 Drawing Sheet

METHOD FOR PREPARING FERRIC CHLORIDE

BACKGROUND OF THE INVENTION

The present invention relates to a method for preparing an anhydrous ferric chloride from a dilute ferrous or ferrous-ferric chloride solution.

Ferric chloride $FeCl_3$ is conventionally prepared in an anhydrous form by allowing a chlorine gas to affect glowing iron. As a solution it is in turn obtained by dissolving an iron oxide or carbonate or a metallic iron in a hydrochloric acid or nitrohydrochloric acid. When crystallizing from water, the ferric chloride forms various hydrates, such as a hexahydrate $FeCl_3 . 6 H_2O$), i.e., the so-called yellow iron chloride, known as a commercial product.

Methods are known, in which the ferrous chloride $FeCl_2$ acting as a reactant is oxidated into ferric chloride. FI Patent publication No. 77006 (int. cl. CO1G 49/00) describes a method for partially oxidating $FeCl_2$ into $FeCl_3$. In the method, a temperature of 350° C.-675° C. is maintained in a tubular reaction area, and a filling layer moving downwards contains a solid ferrous chloride and carbon, whereas oxygen gas is passed from below upwards.

Several ways are known for converting ferrous chloride into ferric chloride, e.g. for using chlorine (FI Application Nos. 892059, 892060 and 892061).

A method is also known for converting a concentrated ferrous solution into ferric chloride, e.g. by means of oxygen gas (U.S. Pat. No. 4,248,851).

Ferric chloride is used, e.g., for purifying water as well as an oxidation agent in industry, e.g. in the color industry, as a catalyst, e.g. in Friedel-Crafts syntheses.

The ferric chloride form used most commonly is a solution, but in some specific application conditions, an anhydrous crystalline salt is required.

For example, when preparing conductive polymers, anhydrous ferric chloride ($FeCl_3$) is used as an oxidation catalyst, which is reduced in the process partially a bivalent ferrous chloride ($FeCl_2$).

The ferric chloride acts in the reaction as an oxidant, receiving 2 electrons per 1 mol of monomer and simultaneously reducing into a ferrous form. The releasing protons and the chloride are combined to form HCl. Water and possibly alcohol is used for washing the polymer, and the washing water obtained is a dilute ferrous-ferric chloride solution containing hydrochloric acid and organic compounds.

To date, it has not been possible to prepare anhydrous $FeCl_3$, since ferric chloride easily decomposes into oxychloride and hydrochloric acid.

OBJECTS AND SUMMARY OF THE INVENTION

In view of the above, it is an object of the present invention to prepare anhydrous $FeCl_3$.

It is a further object of the present invention to achieve from an iron-chloride water solution an anhydrous ferric chloride having a suitable particle size and form.

These objects and others are achieved by the present inventive method for preparing an anhydrous ferric chloride from a hydrous solution containing ferric chloride that possibly contains organic substances.

The method of the present invention comprises the following steps:

(a) water is removed from a ferric-chloride water solution or a solution in which at least a portion of the ferrous chloride present therein has been converted by oxidation into ferric chloride, by drying in an atmosphere containing hydrochloric acid, and (b) the anhydrous ferric chloride is refined by sublimating it into a gas phase by exposing it to a chlorine-containing atmosphere and thereafter converting the resultant gaseous ferric chloride into pure crystalline ferric chloride.

If the regenerated solution contains bivalent iron, it can be converted by oxidation into trivalent iron. For example, hydrogen peroxide, oxygen or chlorine can be used as an oxidant.

The oxidation by hydrogen peroxide can even occur in a relatively dilute solution according to the following reaction equation:

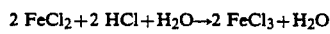

$$2 FeCl_2 + 2 HCl + H_2O \rightarrow 2 FeCl_3 + H_2O$$

After the oxidation, there is no free hydrochloric acid to be neutralized in the solution, as is the case when using chlorine.

It is advantageous but not necessary that the iron chloride solution is concentrated before the drying is to be performed in an HCl atmosphere. The concentration may be performed before the oxidation, during the oxidation or thereafter. The concentration of the solution may be performed, e.g., by means of a multiphase evaporator into a concentration from about 10 to about 18%, and preferably from about 15 to about 16%, whereby the organic solvent residues are simultaneously stripped away.

The drying occurs in an atmosphere containing HCl for maintaining the product as a ferric chloride and thus for avoiding its decomposition into ferric oxy-chloride (FeOCl) or ferric oxide ($Fe_2O_3$) and hydrochloric acid (HCl). First, various iron hydrates are obtained, and by further increasing the temperature, crystal waters leave the solution up to about 150° C. The drying is most preferably performed at a temperature from about 70° to about 110° C. The product is essentially an anhydrous $FeCl_3$ possibly containing impurities of the reactant.

The sublimation step comprises an increase in the temperature over 250° C. in a $Cl_2$ atmosphere. Preferably, the sublimation step comprises an increase in the temperature to from about 275° C. to about 350° C.). The pure $FeCl_3$ then sublimates (evaporates) into a gas phase, and it may be sublimed on a colder surface.

The drying cannot be performed directly by heating in an air atmosphere, since ferric chloride decomposes, e.g., into an iron oxide and hydrochloric acid. Instead, a dilute iron chloride residue solution containing organic substances may be evaporated into a solution containing 16% iron either before the oxidation or thereafter.

The actual sublimation has to occur in a $Cl_2/HCl$ atmosphere. In this case, $FeCl_3$ does not decompose. The sublimated ferric chloride crystallizes into a cooled distillation receiver, whereby a pure anhydrous ferric chloride is obtained. By varying the conditions, the crystalline size and form may be adjusted e.g. into a very small crystalline form, which may be reused, e.g., as an oxidant when polymerizing heterocyclic compounds.

BRIEF DESCRIPTION OF THE DRAWING

A principal process scheme of a recirculation of ferric chloride used in a preparation of polymers for reusage is shown in FIG. 1.

Although the final product of inventive process is in fact crystalline and anhydrous $FeCl_3$, iron salts in solution known as water chemicals are obtained e.g. from the concentration step during the process.

Figure 1:
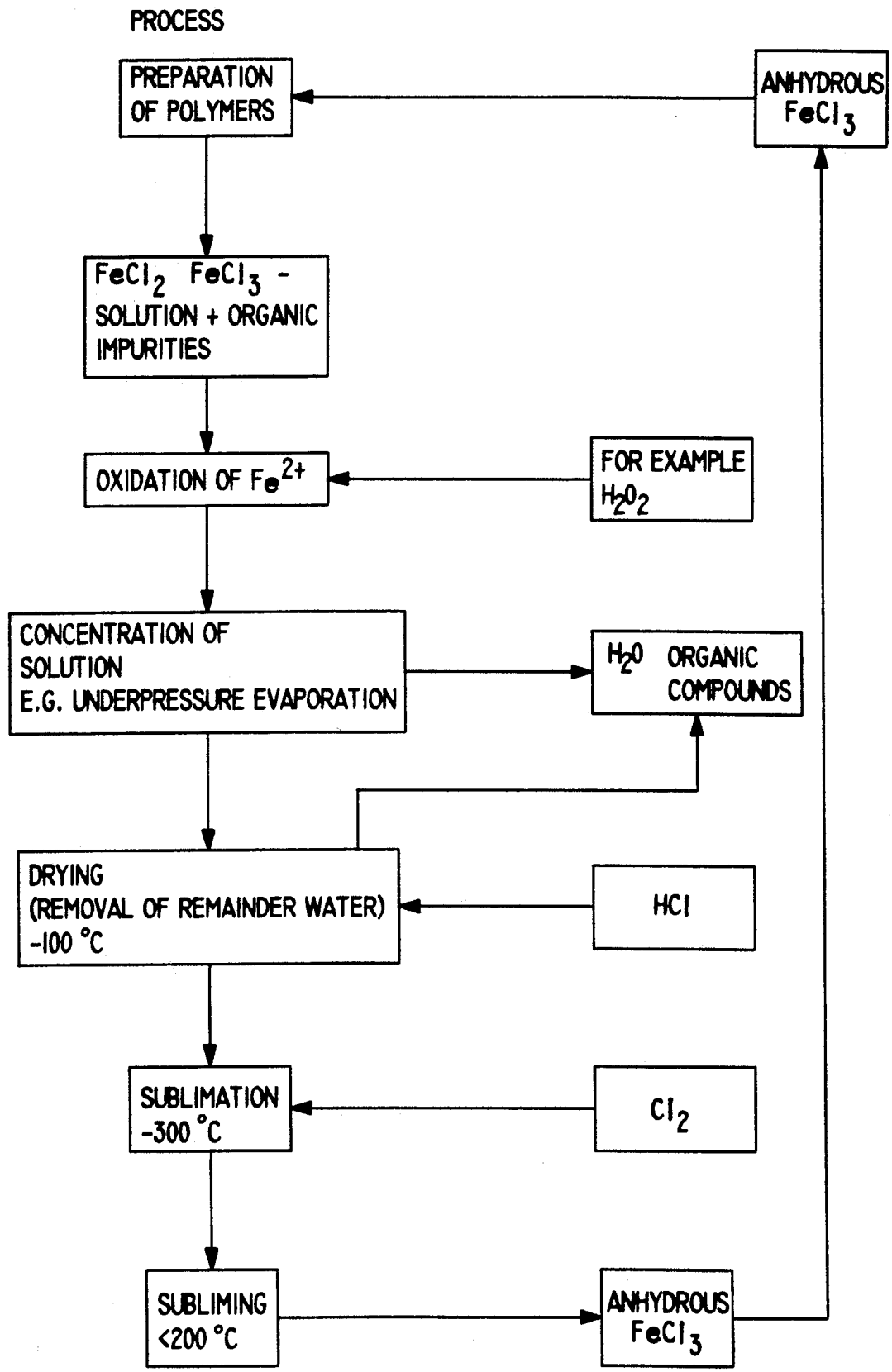

It has also to be observed that, although the invention has been described by using as a raw material an $Fe^{2+}$/$Fe^{3+}$ chloride containing organic compounds, it may be applied to the conversion of any hydrous iron-containing solution into anhydrous ferric chloride. In this case, the steps are used only when applicable; e.g., if the reactant is a slightly concentrated ferric chloride solution, a start may be begun directly from the drying step. For example, pickling solutions used in the steel industry may be given as examples of such solutions.

DETAILED DESCRIPTION OF THE PREFERRED EMBODIMENTS

EXAMPLE 1

A ferric chloride solution was dried by spray drying, whose composition was: 16.0% of $Fe^{3+}$, 30.5% of Cl. The carrier gas of the drying was air at a temperature of 180° C. The analysis of the dry product was: 34.0% of $Fe^{3+}$, 0.7% of $Fe^{2+}$, 38.0% of $Cl^-$, and 10.8% of $H_2O$, and the molar ratio $Cl^-$/Fe was 1.73.

It can be seen that nearly 50% of the product had decomposed, since said preparation method did not correspond to the invention.

When sublimating and subliming 2.2 g of the intermediate product obtained above, 0.8 g of a crystalline anhydrous ferric chloride could be sublimed, whose analysis was as follows: $Fe^{3+}$ 34.0%, $Fe^{2+}$ <0.01%, and $Cl^-$ 61%. The molar ratio of $Cl^-$/Fe was 2.9, i.e., a product whose composition was as desired. The yield of the product from the reactant was only about 40%.

EXAMPLE 2

A ferric chloride solution was dried in a fluidized-bed drier, the composition of which solution was: $Fe^{3+}$ 16.0%, $Fe^{2+}$ <0.1%, $Cl^-$ 65.0%, $H_2O$ 0.31%. The intermediate product (0.91 g) was sublimated at 300° C. in a $Cl_2-$ cycle and sublimed on a cold surface. The composition of the product (0.71 g) was:

| Fe | 34% |
| --- | --- |
| $Fe^{2+}$ | <0.02% |
| Cl | 64% |
| $H_2O$ | 0.1% |
| $Cl^-$Fe | 2.97% |

EXAMPLE 3

When polymerizing the reactant solution obtained, whose combination was: 0.8% of $Fe^{3+}$, 1.2% of $Fe^{2+}$, 4.9% of free HCl, one liter was taken and oxidated with $H_2O_2$ (4.4 g) and a solution was obtained, whose $Fe^{2+}$ was <0.02%. The solution was evaporated by means of an underpressure evaporator until the total Fe was 13%. The solution contained organic substances as TOC<0.1%, whereby they had stripped away during the evaporation. 5 ml of the solution was dried in a fluidized-bed drier in an HCl atmosphere, and 2.6 g of an anhydrous $FeCl_2$ was obtained, whose composition was:

| Fe (total) | 32% |
| --- | --- |
| $Fe^{2+}$ | 1.1% |
| Cl | 65% |
| [Cl]/[Fe] | 3.0% |
| $H_2O$ | 0.2% |
| TOC | <0.1% |

The intermediate product (2.3 g) obtained was sublimated and sublimed in a $Cl_2-$ cycle, whereby as a product was obtained 2.2 g of a crystalline $FeCl_3$, whose composition was:

| Fe (total) | 34% |
| --- | --- |
| $Fe^{2+}$ | <0.01% |
| Cl | 66% |
| [Cl]/[Fe] | 3.0% |
| $H_2O$ | 0.2% |
| TOC | <0.1% |
| Yield | 93% |

What is claimed is:

1. A method for preparing an anhydrous ferric chloride from a hydrous iron-containing solution with or without additional organic substances, comprising:
    a) removing water from an iron-containing solution comprising a ferric-chloride water solution or a solution comprising ferrous chloride and ferric chloride by drying the solution at a temperature greater than about 70° C. in a hydrochloric acid atmosphere,
    b) sublimating the anhydrous ferric chloride into a gas phase by exposing said anhydrous ferric chloride to a chlorine atmosphere at a temperature greater than about 250° C., and thereafter
    c) converting the gaseous ferric chloride into pure crystalline ferric chloride.

2. The method of claim 1, wherein said iron-containing solution is a solution comprising ferrous chloride and ferric chloride, further comprising oxidizing said solution with hydrogen peroxide prior to drying.

3. The method of claim 1, further comprising concentrating the iron-containing solution before the drying step (a) to an iron concentration from about 10 to about 18%.

4. The method of claim 3, wherein step (b) is performed before the concentration step (a), or simultaneously.

5. The method of claim 1, further comprising concentrating the iron-containing solution before the drying step (a) to an iron concentration from about 13 to about 16%.

6. The method of claim 1, wherein said hydrochloric acid atmosphere for step (a) is essentially dry HCl or HCl diluted with inert-gas.

7. The method of claim 1, further comprising concentrating the iron-containing solution such that the iron-containing solution entering the drying contains only crystal waters.

* * * * *